(12) United States Patent
Kim et al.

(10) Patent No.: US 6,930,826 B2
(45) Date of Patent: Aug. 16, 2005

(54) ALL-OPTICAL XOR GATE BY USING SEMICONDUCTOR OPTICAL AMPLIFIERS

(75) Inventors: Jae Hun Kim, Seoul (KR); Young Tae Byun, Gyunggi-do (KR); Young Min Jhon, Seoul (KR); Seok Lee, Seoul (KR); Deok Ha Woo, Seoul (KR); Sun Ho Kim, Gyunggi-do (KR); Kwang Nam Kang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 141 days.

(21) Appl. No.: 10/175,610

(22) Filed: Jun. 20, 2002

(65) Prior Publication Data

US 2003/0058527 A1 Mar. 27, 2003

(30) Foreign Application Priority Data

Sep. 20, 2001 (KR) .............................. 2001-58131

(51) Int. Cl.[7] ................................................ H01S 3/00
(52) U.S. Cl. .......................... 359/344; 359/333; 359/108
(58) Field of Search .................................. 359/344, 333, 359/108

(56) References Cited

U.S. PATENT DOCUMENTS 6,462,865 B1 * 10/2002 Chu et al. .................... 359/344
6,522,462 B2 * 2/2003 Chu et al. .................... 359/344

* cited by examiner

*Primary Examiner*—Mark Hellner
(74) *Attorney, Agent, or Firm*—Harness, Dickey & Pierce, P.L.C.

(57) ABSTRACT

The present invention relates to a method of embodying all-optical XOR logic gate by using semiconductor optical amplifier, and more particularly, to a technique to embody all-optical XOR logic gate utilizing the cross-gain modulation (XGM) characteristic of semiconductor optical amplifiers controllable with input currents, illumination signal, and pumping signal.

The method of all-optical XOR logic element in accordance with the present invention is characterized to obtain operational characteristic of the all-optical XOR logic element by inputting pump-signal and illumination signal concurrently into two semiconductor optical amplifiers and then summing the two output signals having XGM characteristic arising from gain saturation and wavelength conversion of the semiconductor optical amplifiers.

4 Claims, 4 Drawing Sheets

ALL-OPTICAL XOR GATE BY USING SEMICONDUCTOR OPTICAL AMPLIFIERS

BACKGROUND OF THE INVENTION

1. Field of the Invention

The present invention relates to a method of embodying all-optical XOR logic gate by using semiconductor optical amplifiers. More particularly, the present invention relates to a technique to embody all-optical XOR logic gate by utilizing the inverter characteristic of semiconductor optical amplifiers controllable with input currents, illumination signals, and pumping signals.

2. Description of the Related Art

In recent years, needs for high speed and large capacity of calculating systems have been increased. However, almost all calculation systems based on silicon material and electric signals have barriers in speed and capacity.

On the other hand, calculation systems using optical elements based on InP are coping with such barriers of speed and information processing capacity.

Generally, single optical logic elements such as AND, OR, XOR, NAND, NOR, and NXOR are integrated to constitute calculating systems. The integration technique is indispensable to calculation systems using optical signals.

Recently, researches have been focused on the XOR logic element development since XOR logic has various applications to communication purposes such as decision-making and packet switching (Refer to IEEE Photonics Technology Letters, Vol. 13, No. 7, pp. 750–752 (2001) by T. Fjelde, A. Kloch, D. Wolfson, B. Dagens, A. Coquelin, I. Guillemot, F. Gaborit, F. Poingt, and M. Renaud.). Examples include: XOR using Ultrafast Nonlinear Interferometer (UNI) presented by C. Bintjas, M. Kalyvas, G. Theophilopoulos, T. Stathopoulos, H. Avramopoulos, L. Occhi, L. Schares, G. Guekos, S. Hansmann, and R. Dall'Ara in IEEE Photonics Technology Letters, Vol. 12, No. 7, pp. 834–836 (2000); XOR using Tetrahertz Optical Asymmetric Demultiplexer (TOAD) presented by Pousite, Blow, Kelly, and Manning in Opt. Commun. 156, pp. 22–26 (1998); XOR using Sagnac gate presented by T. Houbavlis, K. Zoiros, A. Hatziefremidis, H. Avramopoulos, L. Occhi, G. Guekos, S. Hansmann, H. Burkhard, and R. Dall'Ara in Electronics Letters, Vol. 35, No. 19, pp. 1650–1652 (1999); and XOR using Interferometric Wavelength Converter (IWC) presented by T. Fjelde, D. Wolfson, A. Kloch, B. Dagens, A. Coquelin, I. Guillemot, F. Gaborit, F. Poingt, and M. Renaud in Elecronic Letters, Vol. 36, No. 22, pp. 1863–1864 (2000).

Aforementioned elements using UNI, TOAD, and Sagnac gate have the advantage of high operation speed but are difficult to apply to optical calculation systems requiring high density integration because their core element is optical fiber that is difficult to integrate with other elements.

On the other hand, optical logic elements using single Semiconductor Optical Amplifier (SOA) are not only stable, small-sized, and easy to combine with other optical elements but also have the merit of having independence on polarization and wavelength. (Refer to Elecronic Letters, Vol. 36, No. 22, pp. 1863–1864 (2000) by T. Fjelde, D. Wolfson, A. Kloch, B. Dagens, A. Coquelin, I. Guillemot, F. Gaborit, F. Poingt, and M. Renaud.)

A forementioned IWC is an element made by integrating these semiconductor optical amplifiers, but not suitable for large-scale fabrication due to its complicated fabrication process.

Moreover, since XOR logic elements disclosed so far depend on clock signal or continuous wave (CW) light, they need additional beam other than input signals A and B.

SUMMARY OF THE INVENTION

The present invention is to resolve the aforementioned problems in the prior art. It is an object of the present invention to provide a method embodying all-optical XOR logic elements by using cross-gain modulation (XGM) of semiconductor optical amplifiers that are more stable and easier to combine with other elements than optical fiber-based elements and that can reduce the size and speed limitation of logic elements by eliminating the need of clock signal or CW light.

To achieve the objects of the present invention, the present invention embodies all-optical XOR logic elements by impinging pump-signals and illumination signals together onto two semiconductor optical amplifiers and then summing output signals with the XGM characteristic arising from gain saturation and wavelength conversion of said semiconductor optical amplifiers.

The present invention does not have clock signal or CW light dependence, since it embodies XOR logic element by using the XGM characteristic of two single semiconductor optical amplifiers.

Therefore, if signal A and signal B that are input to the two single semiconductor optical amplifiers have the same speed, element realization is possible without clock signal.

In the XOR logic element in accordance with the present invention, since Boolean $A\overline{B}$ and $\overline{A}B$ are obtained first and then summed, signals $A\overline{B}$ and $\overline{A}B$ are separable. Therefore, various forms of logic are realizable with using only one all-optical XOR logic element.

The above and other features and advantages of the present invention will be more clearly understood for those skilled in the art from the following detailed description in conjunction with the accompanying drawings, which form part of this disclosure.

DETAILED DESCRIPTION OF THE EMBODIMENT

Hereinafter, the constitution and operation of the present invention is described in detail through preferred embodiments by referring to the accompanying drawings.

Figure 1:
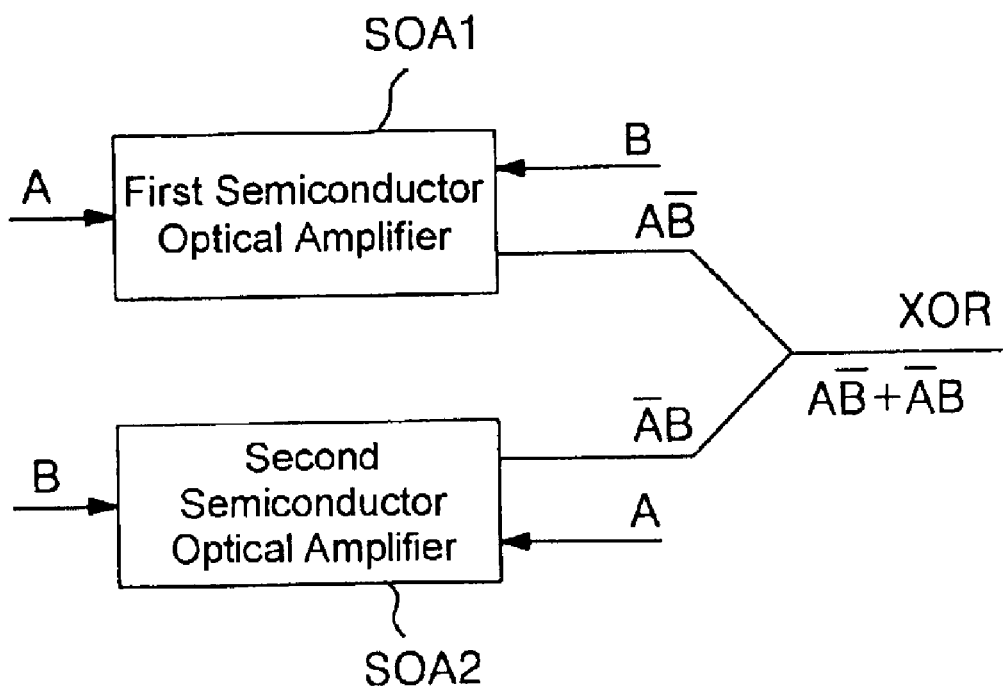
FIG. 1 shows the basic logic concept of XOR logic element in accordance with the present invention.

FIG. 1 shows the basic logic concept of XOR logic element in accordance with the present invention.

The XGM characteristic of semiconductor optical amplifiers (SOA1, SOA2) is adjustable by controlling input current, illumination signal, and pump-signal to the semiconductor optical amplifiers (SOA1, SOA2). The XGM characteristic is obtained by varying light intensity of pump-signal while maintaining increased state of input current at a fixed value and providing illumination signal at a constant light intensity.

Utilizing the above characteristic, in the first semiconductor optical amplifier (SOA1) signal A is modulated using signal B as pump-signal and signal A as illumination signal, while in the second semiconductor optical amplifier (SOA2) signal B is modulated using signal A as pump-signal and signal B as illumination signal.

Upon summing two output signals from the semiconductor optical amplifiers (SOA1, SOA2), embodied is an XOR logic element in which logic value is 1 when only one out of signals A and B has logic value of 1 and logic value is 0 when signals A and B are at the same logic level.

Describing in more detail, if pump-signal is provided to semiconductor optical amplifiers (SOA1, SOA2) with high light intensity, carriers are exhausted in the semiconductor optical amplifiers.

If illumination signals are applied concurrently to the semiconductor optical amplifiers (SOA1, SOA2), gain saturation occurs in the semiconductor optical amplifiers because carriers are exhausted by pump-signals, and therefore output of illumination signal diminishes gradually in its light intensity.

As a result, output signal has reverse value of that of incident signal representing the data.

Such XGM characteristic has the outputs as shown below by tables 1 and 2 for given incident signals A and B.

TABLE 1

| A | B | OUT |
|---|---|-----|
| 0 | 0 | 0 |
| 0 | 1 | 0 |
| 1 | 0 | 1 |
| 1 | 1 | 0 |

TABLE 2

| A | B | OUT |
|---|---|-----|
| 0 | 0 | 0 |
| 0 | 1 | 1 |
| 1 | 0 | 0 |
| 1 | 1 | 0 |

If the first semiconductor optical amplifier (SOA1) is impinged with signal A as illumination signal and signal B as pump-signal, the Boolean $A\bar{B}$ such as in Table 1 is resulted. On the other hand, if the second semiconductor optical amplifier (SOA2) is impinged with signal A as pump-signal and signal B as illumination signal, the Boolean $\bar{A}B$ such as in Table 2 is resulted.

Therefore, on summing output signals $A\bar{B}$ and $\bar{A}B$, an XOR logic element having output value of $A\bar{B}+\bar{A}B$ as shown in Table 3 is realizable.

TABLE 3

| A | B | XOR |
|---|---|-----|
| 0 | 0 | 0 |
| 0 | 1 | 1 |
| 1 | 0 | 1 |
| 1 | 1 | 0 |

Figure 4:
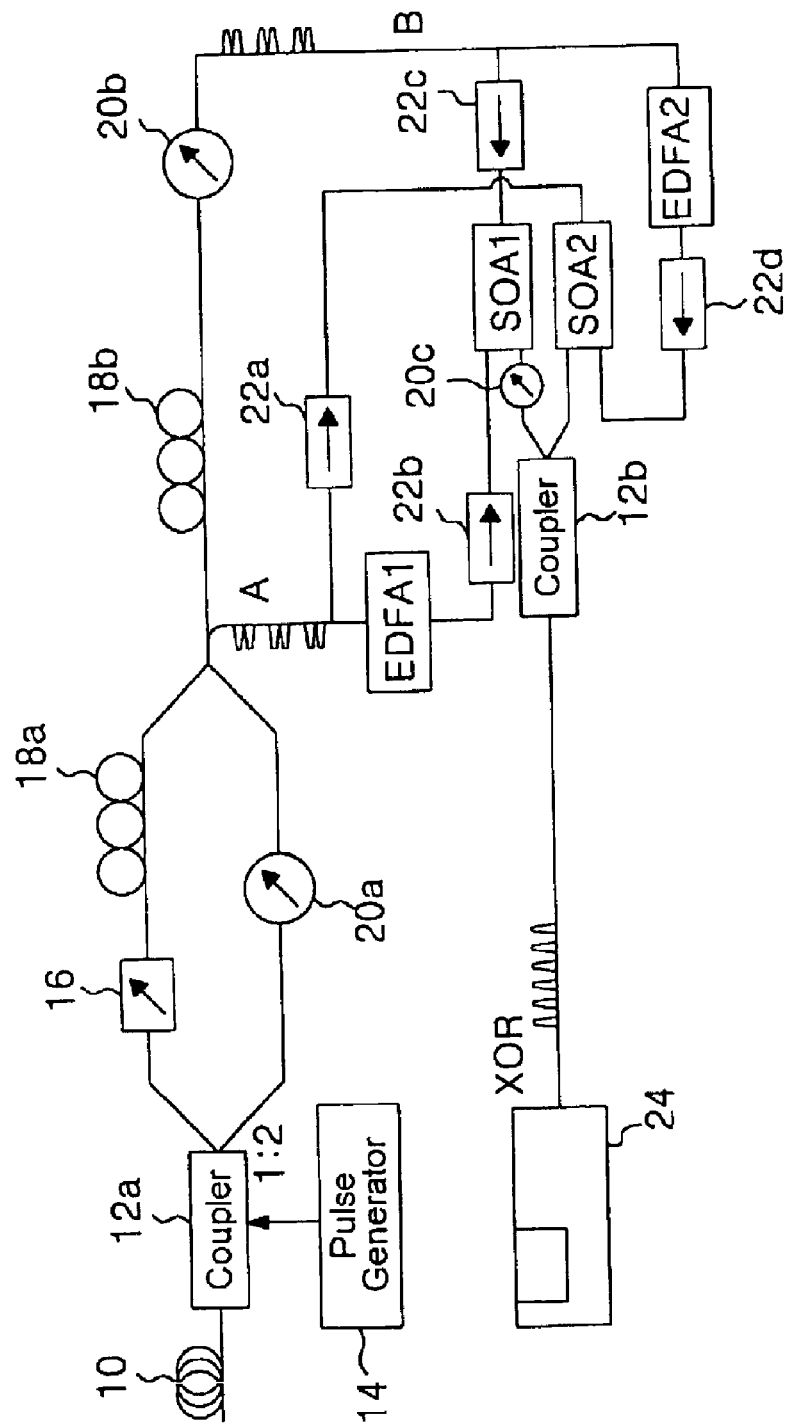
FIG. 4 shows an experimental configuration for embodying XOR logic element in accordance with the present invention.

FIG. 4 shows an experimental configuration for embodying the all-optic XOR logic element in accordance with the present invention.

First, pulse signals with spacing of 800 ps are generated using pulses (10) from fiber ring laser and pulse generator (14).

The above pulses are input to 50:50 coupler (12a) and then branched into two parts. One of the branched signals is put through optical delay (20a) and delayed by 200 ps, and the other signal is put through attenuator (16) and polarization controller (18a). And the two signals are then summed to make signal A.

Signal A having pattern of 1100 (One-One-Zero-Zero) is again put through polarization controller (18b) and optical delay (20b) and delayed by 600 ps to make signal B having pattern of 1001.

For the first semiconductor optical amplifier (SOA1), signal A as illumination signal is input through Erbium-doped fiber amplifier (EDFA1) and optical isolator (22b), and signal B as pump-signal is input through optical isolator (22c).

For the second semiconductor optical amplifier (SOA2), signal A is input through optical isolator (22a) as pump-signal, signal B is input through Erbium-doped fiber amplifier (EDFA2) and optical isolator (22d) as illumination signal.

Figure 2:
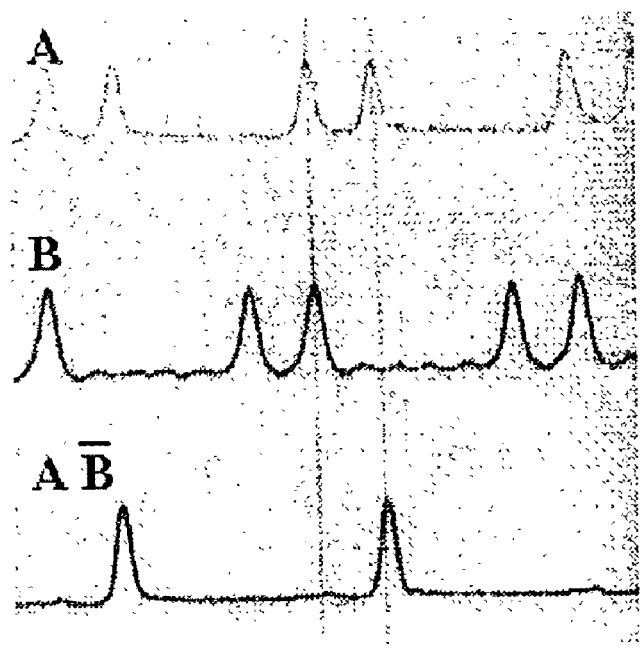
FIG. 2 illustrates an output screen of Boolean logic signal $A\overline{B}$ by XOR logic element in accordance with the present invention.
Figure 3:
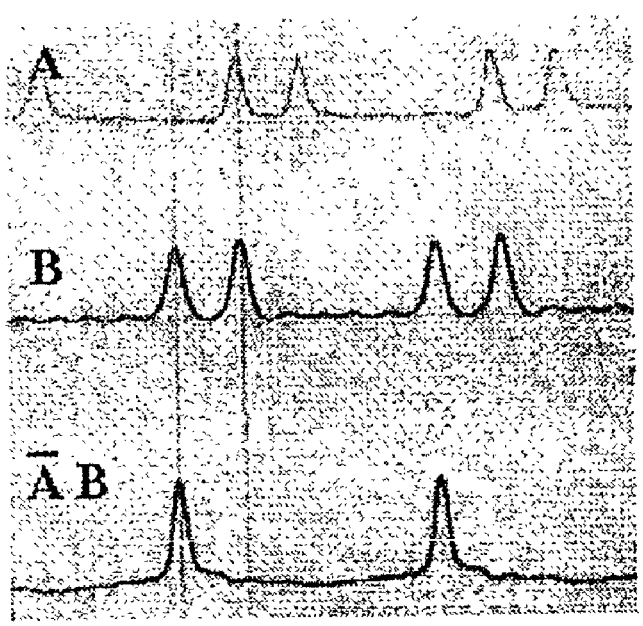
FIG. 3 illustrates an output screen of Boolean logic signal $\overline{A}B$ by XOR logic element in accordance with the present invention.

The first semiconductor optical amplifier (SOA1) generates Boolean $A\bar{B}$ as shown in FIG. 2 and the second semiconductor optical amplifier (SOA2) generates Boolean $\bar{A}B$ as shown in FIG. 3. Now the two generated signals are summed by 50:50 coupler (12b) to generate the output signal shown in FIG. 5 that is visualized by an oscilloscope connected to the signal analyzer (24).

The detected output is found to be identical to Boolean $A\bar{B}+\bar{A}B$ that is shown in the logic table of TABLE 3 for all-optical XOR logic element.

Figure 5:
FIG. 5 illustrates an output screen of logic signal of XOR logic element operating at 5 Gb/s in accordance with the present invention.

FIG. 5 represents the XOR logic element's operating characteristic resulting from summing outputs of the first semiconductor optical amplifier (SOA1) and the second semiconductor optical amplifier (SOA2). The figure ascertains signal A having pattern of 1100 and signal B having pattern of 1001 are summed to make the output signal having pattern of 0101.

Observing the output signals, when signal A is logic 0 and signal B is logic 1 or when signal A is logic 1 and signal B is logic 0, the output signal becomes logic 1.

When two signals have the same logical value, in other words when both of signals A and B are either 0 or 1, the output signal has logic 0.

Since this result is identical to that of TABLE 3, the characteristic of XOR logical element is found experimentally verifiable.

By aforementioned logic experiment, it has now verified that all-optical XOR logic element operable at 5 Gb/s could be developed.

The above all-optical XOR logic element, along with other all-optical logic elements, is indispensable in constituting a large-scale computing system because it is core elements for half-adders or full-adders that are the basic elements for logic calculations.

Therefore, due to the efficient integration technique for logic elements as in the present invention, it is possible to control all the computation systems with optical signals without depending on electric signals.

As shown in the above, since all-optical XOR logic element is embodied using the XGM characteristic of semiconductor optical amplifiers, the XOR logic element in accordance with the present invention is more stable and more easily connectable to other logical elements compared with other elements based on optical fiber. Also, since there is no need to provide clock signal or CW light, it is much favorable in the size and the speed limitation of logic elements.

Although the present invention has been described along with the accompanying drawings, this only illustrates preferred embodiments but not limits the scope of the present invention. It will be apparent for those skilled in the art that various modifications may be made without departing from the spirit and scope of the present invention as defined by the appended claims.

What is claimed is:

1. A method of embodying all-optical XOR logic element using semiconductor optical amplifiers characterized to obtain operational characteristic of said all-optical XOR logic element by inputting pump-signal and illumination signal concurrently into two semiconductor optical amplifiers; and then summing two output signals having cross-gain modulation (XGM) characteristic arising from gain saturation and wavelength conversion of said semiconductor optical amplifiers, wherein illumination signal incident on one of said semiconductor optical amplifiers becomes pump-signal for the other semiconductor optical amplifier, while pump-signal to said one semiconductor optical amplifier becomes illumination signal for the other semiconductor optical amplifier.

2. The method of embodying all-optical XOR logic element using semiconductor optical amplifiers of claim 1, wherein said illumination signal incident on one of said semiconductor optical amplifiers is made in such a way that:

pulse signal is generated using optical fiber ring laser and pulse generator;

said pulse signal is coupled in a coupler and then branched into two parts; and one part is delayed by a certain amount of time and then summed with the other part.

3. The method of embodying all-optical XOR logic element using semiconductor optical amplifiers of claim 1, wherein illumination signal incident on one of said semiconductor optical amplifiers is delayed by a certain amount of time and then provided as pump-signal to the other semiconductor optical amplifier.

4. The method of embodying all-optical XOR logic element using semiconductor optical amplifiers of claim 2, wherein illumination signal incident on one of said semiconductor optical amplifiers is delayed by a certain amount of time and then provided as pump-signal to the other semiconductor optical amplifier.

* * * * *